(12) United States Patent
An et al.

(10) Patent No.: US 11,993,160 B2
(45) Date of Patent: May 28, 2024

(54) PERSONAL MOBILITY, SERVER, AND METHOD OF MANAGING PERSONAL MOBILITY

(71) Applicants: HYUNDAI MOTOR COMPANY, Seoul (KR); KIA CORPORATION, Seoul (KR)

(72) Inventors: Rowoon An, Seoul (KR); Jae Yul Woo, Seoul (KR); Soobin Kim, Seoul (KR); Seunghyun Woo, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 416 days.

(21) Appl. No.: 17/462,679

(22) Filed: Aug. 31, 2021

(65) Prior Publication Data
US 2022/0126707 A1    Apr. 28, 2022

(30) Foreign Application Priority Data
Oct. 26, 2020   (KR) ................. 10-2020-0139457

(51) Int. Cl.
| B60L 53/12 | (2019.01) |
|---|---|
| B60L 53/62 | (2019.01) |
| B60L 53/66 | (2019.01) |
| B60L 58/12 | (2019.01) |
| H02J 50/10 | (2016.01) |

(52) U.S. Cl.
CPC ............... *B60L 53/12* (2019.02); *B60L 53/62* (2019.02); *B60L 53/66* (2019.02); *B60L 58/12* (2019.02); *H02J 50/10* (2016.02)

(58) Field of Classification Search
CPC .......... B60L 53/12; B60L 53/62; B60L 53/66; B60L 58/12; B60L 53/305; B60L 2200/24; B60L 53/14; B60L 53/38; H02J 50/10; H02J 7/0014; H02J 7/00032; H02J 7/342; H02J 50/12; Y02T 10/70; Y02T 10/7072;
(Continued)

(56) References Cited

U.S. PATENT DOCUMENTS

| 2008/0221746 A1* | 9/2008 | Plishner | B60L 53/65 |
|---|---|---|---|
| | | | 701/22 |
| 2012/0139335 A1* | 6/2012 | Holland | B60L 53/16 |
| | | | 307/9.1 |

(Continued)

*Primary Examiner* — Abby Y Lin
*Assistant Examiner* — Danielle M Jackson
(74) *Attorney, Agent, or Firm* — MCDONNELL BOEHNEN HULBERT & BERGHOFF LLP

(57) ABSTRACT

Provided is a server including a communicator, and a controller electrically connected to the communicator. The controller is configured to receive, from a plurality of personal mobilities, first information related to a battery of each of the plurality of personal mobilities through the communicator, transmit, to a first personal mobility among the plurality of personal mobilities, a first control signal for causing a first conductive coil of the first personal mobility to be switched into a state for power transmission through the communicator, based on the first information, and transmit, to a second personal mobility among the plurality of personal mobilities, a second control signal for causing a second conductive coil of the second personal mobility to be switched into a state for power reception through the communicator.

9 Claims, 9 Drawing Sheets

(58) Field of Classification Search
CPC ......... Y02T 90/12; Y02T 90/14; Y02T 90/16; G06Q 50/30; B62J 43/10; B62K 15/00
See application file for complete search history.

(56) References Cited

U.S. PATENT DOCUMENTS

| | | | |
|---|---|---|---|
| 2019/0244284 A1* | 8/2019 | Miwa | G07F 15/005 |
| 2020/0114771 A1* | 4/2020 | van Duijsen | B60L 50/20 |
| 2021/0006094 A1* | 1/2021 | Shijo | H02J 50/12 |
| 2021/0053458 A1* | 2/2021 | Fujiwara | B60L 50/50 |
| 2022/0348104 A1* | 11/2022 | Brannan | G01R 31/367 |
| 2022/0366468 A1* | 11/2022 | Karunaratne | B60L 53/80 |
| 2023/0139438 A1* | 5/2023 | Nishita | B60L 53/67 |
| | | | 320/109 |

* cited by examiner

PERSONAL MOBILITY, SERVER, AND METHOD OF MANAGING PERSONAL MOBILITY

CROSS REFERENCE TO RELATED APPLICATIONS

This application is based on and claims priority under 35 U.S.C. § 119 to Korean Patent Application No. 10-2020-0139457, filed on Oct. 26, 2020 in the Korean Intellectual Property Office, the disclosure of which is incorporated herein by reference.

BACKGROUND

1. Field

The present disclosure relates to a personal mobility, a server, and a method of managing a personal mobility.

2. Description of the Related Art

A personal mobility is a personal transportation device, and may include an electric wheel, an electric kickboard, an electric skateboard, and/or an electric bicycle. Recently, along with increasing demand for personal mobilities, the number of sharing service providers of personal mobility is increasing.

A sharing service provider of personal mobility individually manages and delivers personal mobilities for battery charging, state of charge (SoC) checking, repair and/or redistribution.

The conventional personal mobility has a limitation in loading and managing in a unit of series due to its structure.

In addition, when sharing service providers of personal mobility individually manage personal mobilities, a series of tasks repeatedly occurs, which increases management time and economic costs. Accordingly, such a repetition of a series of tasks has a negative influence on business of sharing service providers of personal mobilities.

In addition, there is a lack of technical development on an operating process of managing personal mobilities in a unit of series.

SUMMARY

The present disclosure provides a personal mobility, a server, and a method of managing a personal mobility that are capable of managing personal mobilities in a bundle instead of an individual unit.

For example, a personal mobility, a server, and a method of managing a personal mobility may provide a personal mobility having a box-shaped body that is easy to manage in a bundle and a system capable of performing integrated management on personal mobilities.

For example, a personal mobility, a server, and a method of managing a personal mobility may provide a charging algorithm and/or process of personal mobilities in a bundle.

Additional aspects of the disclosure will be set forth in part in the description which follows and, in part, will be obvious from the description, or may be learned by practice of the disclosure.

According to an aspect of the disclosure, there is provided a server including a communicator, and a controller electrically connected to the communicator. The controller is configured to receive, from a plurality of personal mobilities, first information related to a battery of each of the plurality of personal mobilities through the communicator, transmit, to a first personal mobility among the plurality of personal mobilities, a first control signal for causing a first conductive coil of the first personal mobility to be switched into a state for power transmission through the communicator, based on the first information, and transmit, to a second personal mobility among the plurality of personal mobilities, a second control signal for causing a second conductive coil of the second personal mobility to be switched into a state for power reception through the communicator.

The first information may include a charge amount of the battery of each of the plurality of personal mobilities and information indicating whether the battery of each of the plurality of personal mobilities is being charged.

The controller may be configured to identify the first personal mobility including a first battery, which is being charged, among the plurality of personal mobilities based on the information indicating whether the battery of each of the plurality of personal mobilities is being charged.

The first control signal may include a control signal for causing the first conductive coil of the first personal mobility to be switched into a state for power transmission, based on a first charge amount of the first battery of the first personal mobility being greater than or equal to a predetermined reference value.

The controller may be further configured to transmit, to a third personal mobility among the plurality of personal mobilities, a third control signal for causing a third conductive coil of the third personal mobility to be switched into a state for power reception through the communicator.

The controller may be further configured to determine an order in which the first personal mobility sequentially transmits power to the second personal mobility and then the third personal mobility, based on the charge amount of the battery of each of the plurality of personal mobilities, wherein the first control signal may include information related to the determined order.

The second control signal may include a control signal for causing the second conductive coil of the second personal mobility to be switched into a state for power transmission when the second battery of the second personal mobility is completely charged.

The controller may be configured to receive, from each of the plurality of personal mobilities, second information indicating an arrangement relationship of personal mobilities adjacent to each other through the communicator, and identify the plurality of personal mobilities as being included in a personal mobility bundle based on the second information.

According to another aspect of the disclosure, there is provided a personal mobility including a conductive coil, a wireless charging circuit electrically connected to the conductive coil; a connection terminal, a battery, and a control device electrically connected to the wireless charging circuit, the connection terminal, the battery, and the communication device. The control device is configured to receive first power from an external power source connected to the connection terminal and charge the battery based on the first power, receive a first control signal related to control of the wireless charging circuit from the server through the communication device, based on the charging of the battery and the first control signal, control the wireless charging circuit to cause the conductive coil to be switched into a state for power transmission; and transmit second power induced in the conductive coil through the wireless charging circuit to at least one personal mobility.

The control device may be configured to transmit the second power to the at least one personal mobility through the wireless charging circuit based on a charge amount of the battery being greater than or greater than a predetermined reference value.

The control device may be configured to sequentially transmit the second power to the at least one personal mobility through the wireless charging circuit based on an order in which the power is transmitted and which is included in the first control signal.

The control device may be configured to transmit a charge amount of the battery, information indicating that the battery is being charged, and information indicating an arrangement relationship with the at least one personal mobility to the server through the communication device.

The control device may be further configured to upon receiving a second control signal related to control of the wireless charging circuit, control the wireless charging circuit to cause the conductive coil to be switched into a state for power reception based on the second control signal.

The control device may be further configured to, upon completion of charging of the battery after the conductive coil is switched into the state for power reception, control the wireless charging circuit to cause the conductive coil to be switched into the state for power transmission.

The personal mobility may further include a handle and a wheel that are slid into a box-shaped frame of the personal mobility.

According to another aspect of the disclosure, there is provided a method of managing a personal mobility by a server, the method including receiving, from a plurality of personal mobilities, first information related to a battery of each of the plurality of personal mobilities through a communicator of a server, transmitting, to a first personal mobility among the plurality of personal mobilities, a first control signal for causing a first conductive coil of the first personal mobility to be switched into a state for power transmission through the communicator, based on the first information; and transmitting, to a second personal mobility among the plurality of personal mobilities, a second control signal for causing a second conductive coil of the second personal mobility to be switched into a state for power reception through the communicator.

The first information may include a charge amount of the battery of each of the plurality of personal mobilities and information indicating whether the battery of each of the plurality of personal mobility is being charged.

The method may further include identifying the first personal mobility including a first battery, which is being charged, among the plurality of personal mobilities based on the information indicating whether the battery of each of the plurality of personal mobility is being charged.

The first control signal may include a control signal for causing the first conductive coil of the first personal mobility to be switched into a state for power transmission, based on a first charge amount of the first battery of the first personal mobility being greater than or equal to a predetermined reference value.

The method may further include transmitting, to a third personal mobility among the plurality of personal mobilities, a third control signal for causing a third conductive coil of the third personal mobility to be switched into a state for power reception through the communicator.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
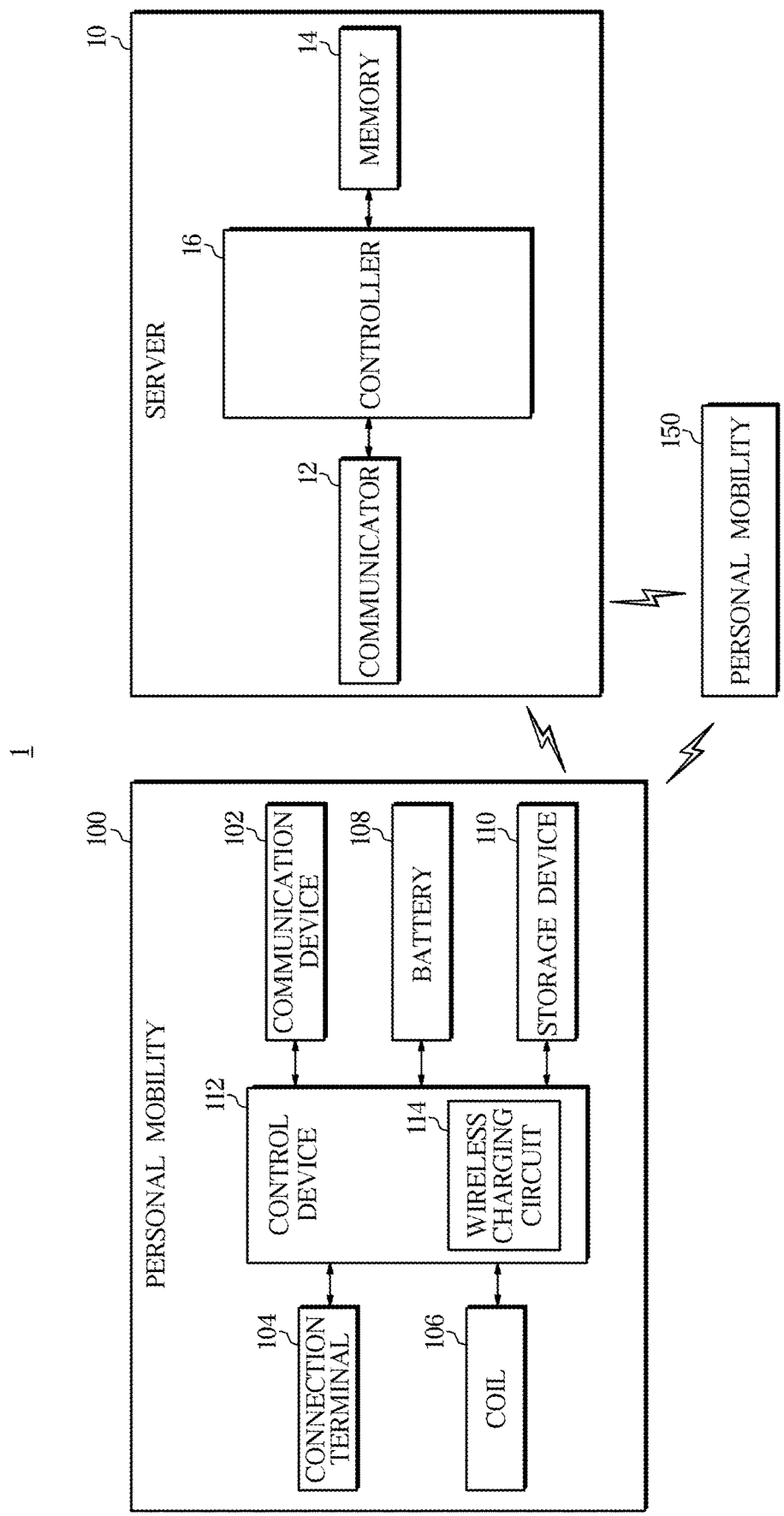
FIG. 1 is a block diagram illustrating a system including a plurality of personal mobilities and a server according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a block diagram illustrating a system 1 including a plurality of personal mobilities 100 and 150 and a server 10 according to an embodiment.

The personal mobility 100 (also referred to as a first personal mobility) includes a communication device 102, a connection terminal 104, coil 106, a battery 108, a storage device 110, and/or a control device 112.

The communication device 102 (also referred to as a communication circuit) may support establishment of a wired communication channel between the personal mobility 100 and an external device, for example, the server 10 and support communication through the established communication channel. For example, the communication device 102 may include a wireless communication module (e.g., a cellular communication module, a Wi-Fi communication module, a short-range communication module, or a global navigation satellite system (GNSS) communication module) to communicate with an external device. The communication device 102 may include a communication circuitry.

The connection terminal 104 may include a connector through which the personal mobility 100 may be physically connected to an external electronic device. For example, the connection terminal 104 may include a Universal Serial Bus (USB) connector and/or a High-Definition Multimedia Interface (HDMI) connector. For example, the personal mobility 100 may receive power (also referred to as first power) from an external power source (not shown) through the connection terminal 104.

For example, the connection terminal 104 may be exposed through a surface of a frame (not shown) of the personal mobility 100.

The coil 106 may include a conductive coil having a spirally wound conductive pattern.

For example, the coil 106 may be formed on at least part of a surface of a frame (not shown) of the personal mobility 100 or disposed inside the frame of the personal mobility 100.

The battery 108 may supply power to at least one component of the personal mobility 100 (the communication device 102, the storage device 110 and/or the control device 112). For example, the battery 108 may supply power required to drive the personal mobility 100.

The storage device 110 may include various types of data used by at least one component of the personal mobility 100 (the communication device 102, the battery 108 and/or the control device 112), for example, input data or output data for a software program and a command related to the software program. The storage device 110 may include a memory, for example, a volatile memory and/or a non-volatile memory.

The control device 112 (also referred to as a control circuit or processor) may control at least one other component (for example, a hardware component (e.g., the communication device 102, the battery 108, and/or the storage device 110) or a software component (e.g., a software program)) of the personal mobility 100, and perform various data processing and operations. The control device 112 may include a processor and a memory.

The control device 112 may include a wireless charging circuit 114.

The wireless charging circuit 114 may be electrically connected to the coil 106. The wireless charging circuit 114 may include a component for wirelessly transmitting and/or receiving power (also referred to as second power or wireless charging power) to/from an external device, for example, the personal mobility 150, through the coil 106 based on the control of the control device 112.

For example, the wireless charging circuit 114 may be operated in a magnetic induction manner.

For example, when loading a plurality of personal mobilities, the separation distance between the plurality of personal mobilities may be short. In this case, the magnetic induction method may be more efficient than the magnetic resonance method as shown in Table 1 below.

TABLE 1

|  | Magnetic induction method | Magnetic resonance method |
|---|---|---|
| Transmission distance | several mm or less | 10 m or less |
| Transmission efficiency | 90% within several mm | 90% within 1 m, 40% within 2 m |

Accordingly, the wireless charging circuit 114 may be operated by magnetic induction. However, this is merely an example, and according to an implementation method and/or a loading method of a plurality of personal mobilities, the wireless charging circuit 114 may operate by magnetic resonance instead of by magnetic induction.

The wireless charging circuit 114 is a well-known technology, and detailed descriptions thereof will be omitted.

Although not shown, the personal mobility 150 (also referred to as a second personal mobility) may include components that correspond to or similar to those of the personal mobility 100, for example, a communication device 102, a connection terminal 104, a coil 106, a battery 108, a storage device 110, and/or a control device 112.

The server 10 may include a communicator 12, a memory 14 and/or a controller 16.

The communicator 12 (also referred to as a communication circuit) may support establishment of a wired communication channel between the server 10, an external device, the personal mobility 100, and/or the personal mobility 150, and support communication through the established communication channel. For example, the communicator 12 may include a wireless communication module (e.g., a cellular communication module, a Wi-Fi communication module, a short-range wireless communication module, or a global navigation satellite system (GNSS) communication module) and communicate with an external device. The communicator 12 may include a communication circuit.

The memory 14 may store various types of data used by at least one component of the server 10 (the communicator 12 and/or the controller 16), for example, input data or output data for software programs and commands related thereto. The memory 14 may include, for example, a volatile memory and/or a non-volatile memory.

The memory 14 may store a program (or an application program) related to sharing and/or management of the personal mobility 100 and/or the personal mobility 150.

The memory 14 may store information for management of a plurality of personal mobilities including the personal mobility 100 and/or the personal mobility 150, such as identification numbers, location information, and/or status information of the plurality of personal mobilities.

The controller 16 (also referred to as a control circuit or processor) may control at least one other component (e.g., a hardware component (e.g., the communicator 12 and/or the memory 14) or a software component (a software program))

of the server 10, and may perform various data processing and operations. The controller 16 may include a processor and a memory.

The controller 16 may manage the plurality of personal mobilities based on information about the plurality of personal mobilities including the first personal mobility 100 and/or the second personal mobility 150, wherein the information is stored in the memory 14.

The controller 16 may identify the plurality of personal mobilities including the first personal mobility 100 and the second personal mobility 150 as one personal mobility bundle, and manage a plurality of personal mobility bundles. For example, the personal mobility bundle may represent a plurality of personal mobilities loaded as one group.

For example, the controller 16 may identity and manage a plurality of personal mobilities as one personal mobility bundle based on information received from the plurality of personal mobilities through the communicator 12 (e.g., information indicating the arrangement relationship of the plurality of personal mobilities).

The controller 16 checks the state of charge (SOC) of each of the batteries of the plurality of personal mobilities included in each of the plurality of personal mobility bundles, and controls at least one personal mobility, for example, the first personal mobility 100, to serve as a power source.

For example, the controller 16 may transmit, to the first personal mobility 100, a control signal (referred to as a first control) for controlling the wireless charging circuit 114 to cause the coil 106 of the first personal mobility 100 to be switched into a state for power transmission through the communicator 12. In addition, the controller 16 may transmit a control signal that allows power to be transferred from the coil 106 of the first personal mobility 100, which serves as a power supply source, to the coils of the remaining personal mobilities that are required to charge the batteries thereof, for example, to the coil of the second personal mobility 150.

The controller 16 may control some of the other personal mobilities among the plurality of personal mobilities, for example, the second personal mobility 150, to serve to receive power from the first personal mobility 100 which serves as a power source.

For example, the controller 16 may transmit, to the second personal mobility 150, a control signal for controlling the wireless charging circuit (not shown) to cause the coil (not shown) of the second personal mobility 100 to be switched into a state for power reception through the communicator 12.

The controller 16 may determine a charging priority (or a charging order) of batteries of personal mobilities that receive power from the personal mobility serving as a power source. The controller 16 may control the first personal mobility 100, which serves as a power source, to sequentially transmit power based on the determined charging priority.

For example, the controller 16 may transmit a control signal through the communicator 12 to the first personal mobility 100 such that the first personal mobility 100 transmits power to the second personal mobility 150, and then transmits power to the third personal mobility (not shown).

In addition, the controller 16 may control the personal mobility, of which charging of the battery is completed, to serve as a power source. When the charging of the battery of the second personal mobility 150 is completed, the controller 16 may control the second personal mobility 150 to transmit power to another personal mobility.

For example, the controller 16 may transmit, to the second personal mobility 150, a control signal for allowing the wireless charging circuit (not shown) of the second personal mobility 150 to control the coil (not shown) of the second personal mobility 150 to be switched into a state for power transmission when the charging of the battery of the second personal mobility 150 is completed, through the communicator 12.

Meanwhile, in the above embodiment, the wireless charging circuit 114 of the personal mobility 100 has been described as being included in the control device 112, but according to another embodiment, the wireless charging circuit 114 may be implemented as a separate component from the control device 112.

In addition, although the first personal mobility 100 has been described as including one coil 106 in the above-described embodiment, the first personal mobility 100 may include a plurality of coils, and each of the plurality of coils may be located on a surface of the frame or in different regions inside the frame.

Although not shown, the personal mobility 100 may further include at least one motor and a driving device capable of controlling the operation of the at least one motor, for example, a rotation direction and/or a rotation speed.

In addition, although not shown, the personal mobility 100 may further include a handle, a wheel, a footrest, and the like. In addition, the personal mobility 100 may further include a radar, a front light, an audio device, a rear wheel cover, a brake device, a suspension, a brake lever, a pressure sensor, a rear light, and/or a haptic device. In addition, the personal mobility 100 may further include various components.

Also, although in FIG. 1, the system 1 is illustrated as including only the first personal mobility 100 and the second personal mobility 150, the system 1 may include other personal mobilities, for example a third personal mobility and/or a fourth personal mobility, and the like, and each of the personal mobilities may include components corresponding to those of the first personal mobility 100.

FIG. 2 is a diagram illustrating a personal mobility (e.g., a personal mobility 100 and/or a personal mobility 150) according to an embodiment.

Referring to FIGS. 2A-2E, in order to store and manage personal mobilities in a series rather than an individual unit, the frames 208 of the personal mobilities may each be implemented in a box-shaped frame structure (a box-shaped body structure or square-shaped structure) that is easy to load.

In addition, in order to facilitate integrated management of personal mobilities and to minimize the loading space between the personal mobilities, components including the kick stand 204, the handle 202, and the wheel 206 are implemented to be inserted into the frame 208 having a box shape.

Figure 2A:
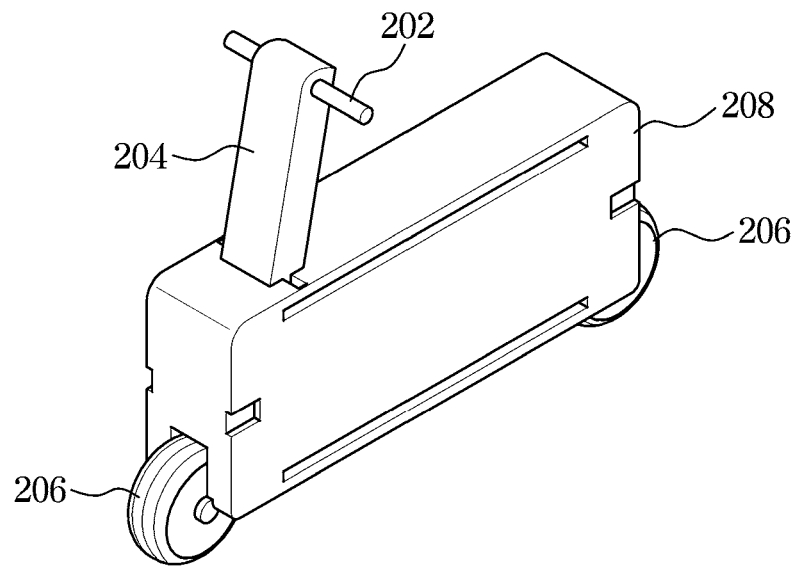
FIGS. 2A, 2B, 2C, 2D, and 2E are diagrams illustrating a personal mobility according to an embodiment.

For example, as shown in FIG. 2A, the handle 202, the kick stand 204, and the wheel 206 of the personal mobility may be implemented to slide into the frame 208.

Figure 2B:
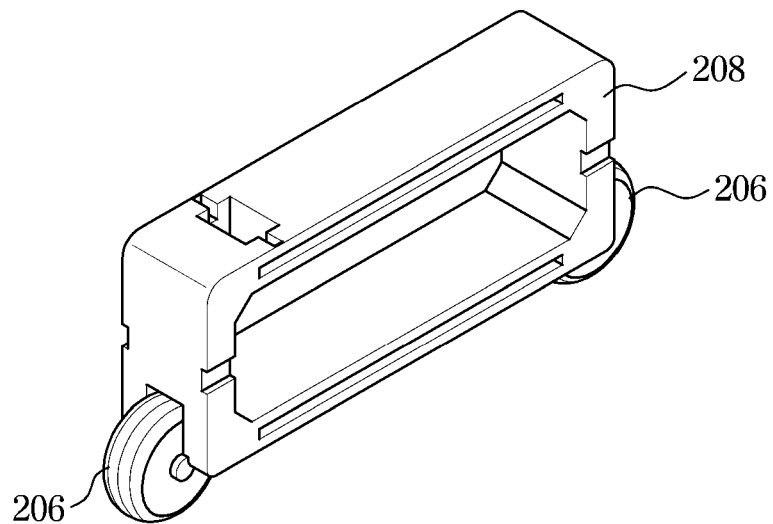
Figure 2C:
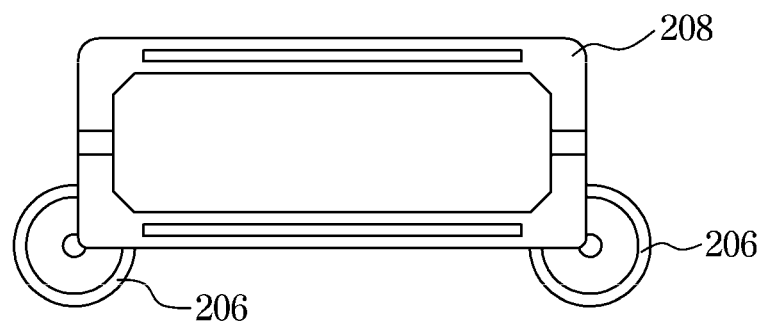
Figure 2D:
Figure 2E:
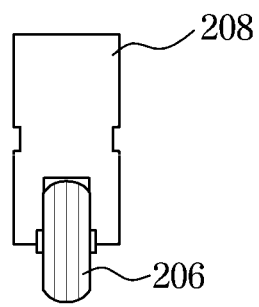

For example, when the components of the personal mobility are inserted into the frame 208 of the personal mobility, the frame 208 of the personal mobility may be provided in the form of a rectangular box as shown in FIGS. 2B, 2C, 2D, and 2E. FIG. 2B is a perspective view illustrating the personal mobility when the components of the personal mobility are inserted into the frame 208 of the personal mobility. In addition, each of the side, top and front of the frame 208 of the personal mobility when the components of the personal mobility are inserted into the frame 208 of the personal mobility are shown in FIGS. 2C, 2B, and 2C, respectively.

Figure 3A:
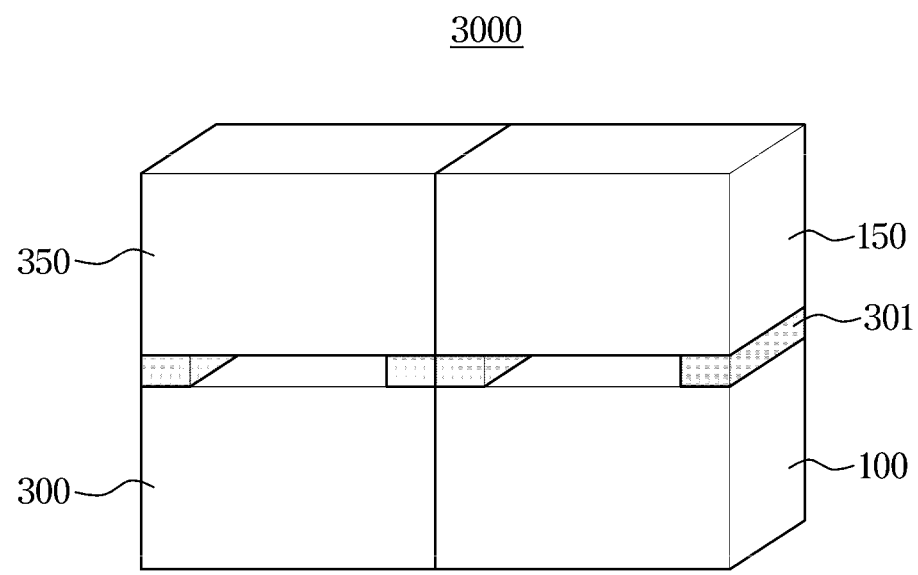
FIGS. 3A and 3B are diagrams illustrating a personal mobility bundle according to an embodiment.
Figure 3B:
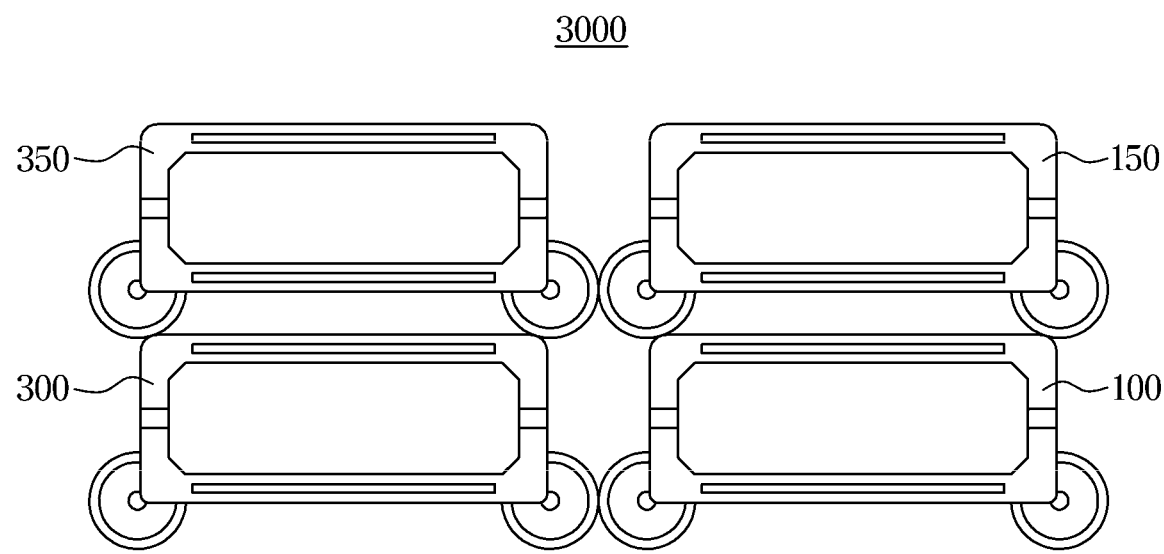

FIGS. 3A-3B are diagrams illustrating a personal mobility bundle 3000 according to an embodiment.

Referring to FIGS. 3A and 3B, the personal mobility bundle 3000 may include four personal mobilities, for example, a first personal mobility 100, a second personal mobility 150, a third personal mobility 300, and a fourth personal mobility 350, and the personal mobilities 100, 150, 300, and 350 may be loaded as shown in FIGS. 3A and 3B. For example, the first personal mobility 100 and the third personal mobility 300 may be located at the bottom, and the second personal mobility 150 and the fourth personal mobility 350 may be located at the top. A fastening structure 301 may be positioned between the personal mobilities so that the personal mobilities are fixed.

Figure 4:
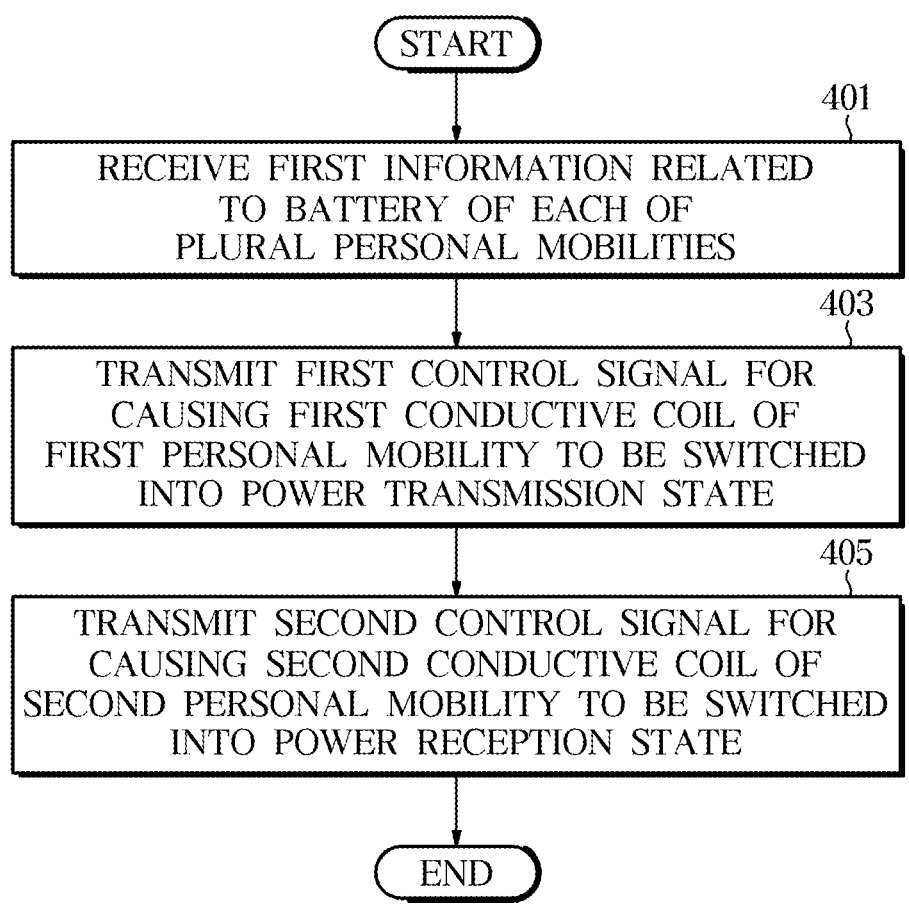
FIG. 4 is a flowchart showing an operation of a server according to an embodiment.

FIG. 4 is a flowchart showing an operation of the server 10 (or the controller 16 of the server 10) according to an embodiment.

The server 10 may receive, from the plurality of personal mobilities (the first personal mobility 100, the second personal mobility 150, the third personal mobility 300, and/or the fourth personal mobility 350), first information related to a battery of each of the plurality of personal mobilities through the communicator 12 at 401.

The first information may include a charge amount of each battery of the plurality of personal mobilities and information indicating whether the battery of each of the plurality of personal mobilities is being charged.

Based on the first information, the server 10 may transmit a first control signal for causing a first conductive coil (e.g., the coil 106) of the first personal mobility 100 among the plurality of personal mobilities to be switched into a state for power transmission to the first personal mobility 100 through the communicator 120 at 403.

The server 10, based on the information which indicates whether each battery of the plurality of personal mobilities is being charged and which is included in the first information, may identify the first personal mobility 100 including a first battery (e.g., the battery 108) being charged among the plurality of personal mobilities.

The first control signal may include a control signal for causing the first conductive coil of the first personal mobility 100 to be switched into a state for power transmission based on a first charge amount of the first battery of the first personal mobility 100 being greater than or equal to a predetermined reference value.

The server 10 may transmit, to the second personal mobility 150 among the plurality of personal mobilities, a second control signal for causing the second conductive coil of the second personal mobility 150 to be switched into a state for power reception through the communicator 120 at 405.

The second control signal may include a control signal for causing the second conductive coil of the second personal mobility 150 to be switched into a state for power transmission when the charging of the second battery of the second personal mobility 150 is completed.

In addition, the second control signal, for switching of the second conductive coil into a state for power reception, may include information related to a switching point in time that reflects a delay time corresponding to a time taken for the first personal mobility 100 to complete preparation for transmission of second power.

For example, for the switching of the second conductive coil into a state of power reception, the second control signal may further include information related to a switching point in time that reflects a delay time based on a separation distance between the first personal mobility 100 and the second personal mobility 150. In addition, the second control signal may include information related to a switching point in time that reflects a delay time based on a time for the first personal mobility 100 to switch the first conductive coil (e.g., the coil 106) into a state of power transmission after the first control signal is transmitted.

Meanwhile, in addition to the above-described embodiment, the server 10 may transmit, to the third personal mobility 300 among the plurality of personal mobilities, a third control signal for causing the third conducive coil of the third personal mobility 300 to be switched into a state for power reception through the communicator 12.

In addition, the server 10 may determine the order in which the first personal mobility 100 sequentially transmits power to the second personal mobility 150 and the third personal mobility 300 based on the charge amount of the battery of each of the plurality of personal mobilities. Accordingly, the first control signal may include information related to the determined order.

In addition, the server 10 may receive second information indicating the arrangement relationship of personal mobilities adjacent to each other from each of the plurality of personal mobilities through the communicator 12. Based on the second information, the server 10 may identify the plurality of personal mobilities as being included in one personal mobility bundle 3000 as shown in FIG. 3.

Figure 5:
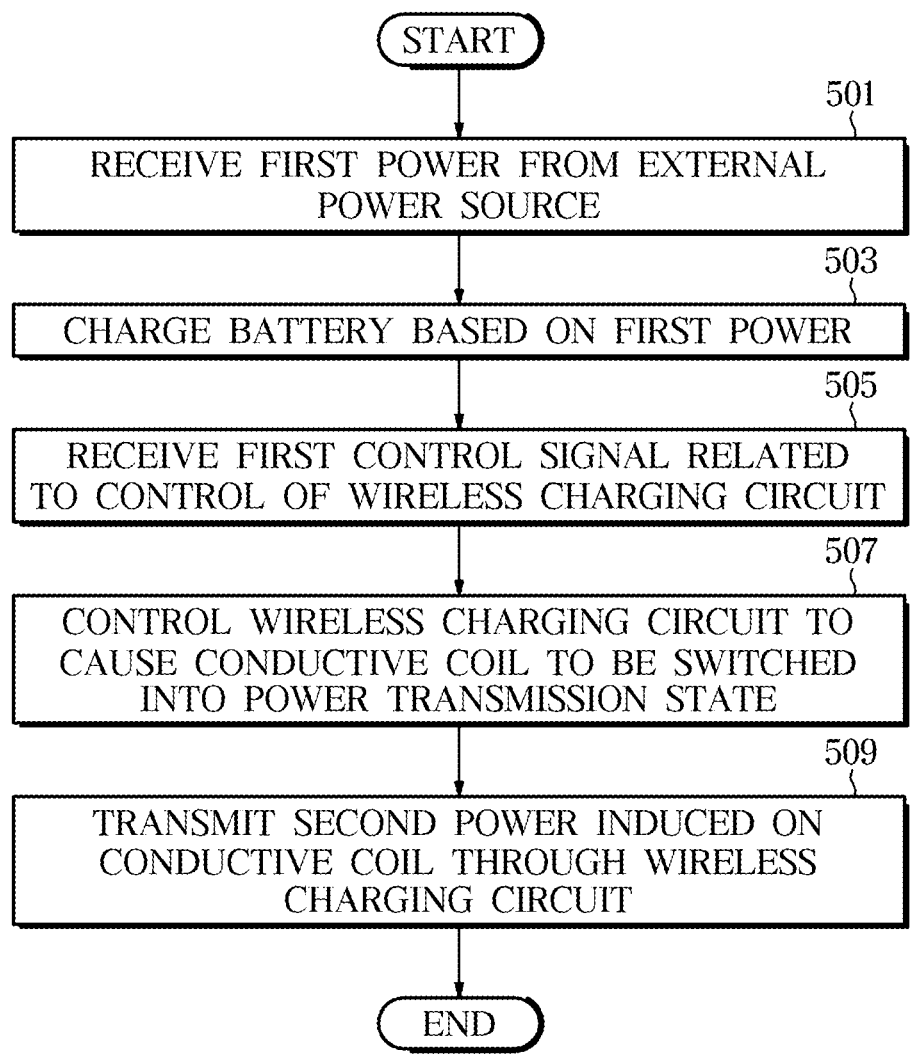
FIG. 5 is a flowchart showing an operation of a personal mobility according to an embodiment.

FIG. 5 is a flowchart showing an operation of the personal mobility 100 (or the control device 112 of the personal mobility 100) according to an embodiment.

The personal mobility 100 may receive first power from an external power source connected to the connection terminal 104 at 501.

The personal mobility 100 may charge the battery 108 based on the first power at 503.

The personal mobility 100 may receive a first control signal related to control of the wireless charging circuit 114 from the server 10 through the communication device 102 at 505.

The personal mobility 100 may, based on the charge of the battery and the first control signal control the wireless charging circuit 114 to cause the conductive coil 106 to be switched into a state for power transmission at 507.

The personal mobility 100 may transmit second power induced on the conductive coil 106 through the wireless charging circuit 114 to at least one personal mobility (e.g., the second personal mobility 150, the third personal mobility 300 and/or the fourth personal mobility 350) at 509.

The personal mobility 100 may transmit the second power to the at least one personal mobility through the wireless charging circuit 114 based on a charge amount of the battery 108 being greater than or equal to a predetermined reference value.

The personal mobility 100 may sequentially transmit the second power to the at least one personal mobility through the wireless charging circuit 114 based on the order of transmitting the power included in the first control signal.

Meanwhile, in addition to the above-described embodiment, the personal mobility 100 may transmit a charge amount, information indicating that the battery 108 is being charged, and information indicating the arrangement relationship of at least one personal mobility device to the server 10 through the communication device 102.

In addition, the personal mobility 100 may receive the first control signal from the server 10 in response to the transmission of the charge amount of the battery 108, the information indicating that the battery 108 is being charged, and the information indicating the arrangement relationship.

Further, in addition to the above-described embodiment, the personal mobility 100, upon receiving a second control signal related to control of the wireless charging circuit 114, may control the wireless charging circuit 114 to cause the conductive coil 106 to be switched into a state for power reception based on the second control signal.

In addition, the personal mobility 100, upon completion of the charging of the battery 108 after the conductive coil 106 is switched into a state for power reception, may control the wireless charging circuit 114 to cause the conductive coil 106 to be switched into a state for power transmission.

Figure 6:
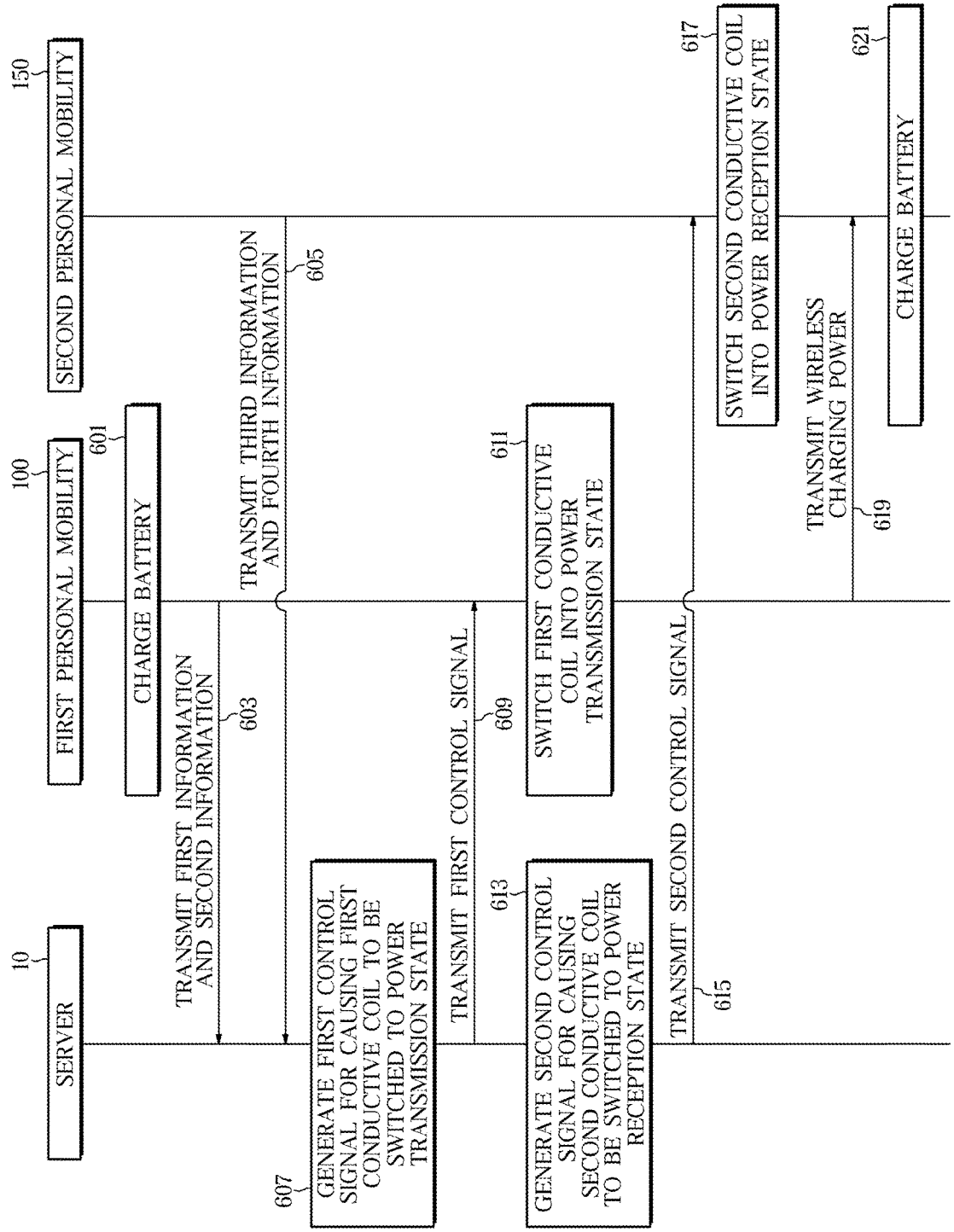
FIG. 6 is a flowchart showing operations of a server, a first personal mobility, and a second personal mobility according to an embodiment.

FIG. 6 is a flowchart showing operations of the server 10 (or the controller 116 of the server 10), the first personal mobility 100 (or the controller device 112 of the first personal mobility 100), and the second personal mobility 150 (the controller device of the second personal mobility 150) according to an embodiment.

Figure 7:
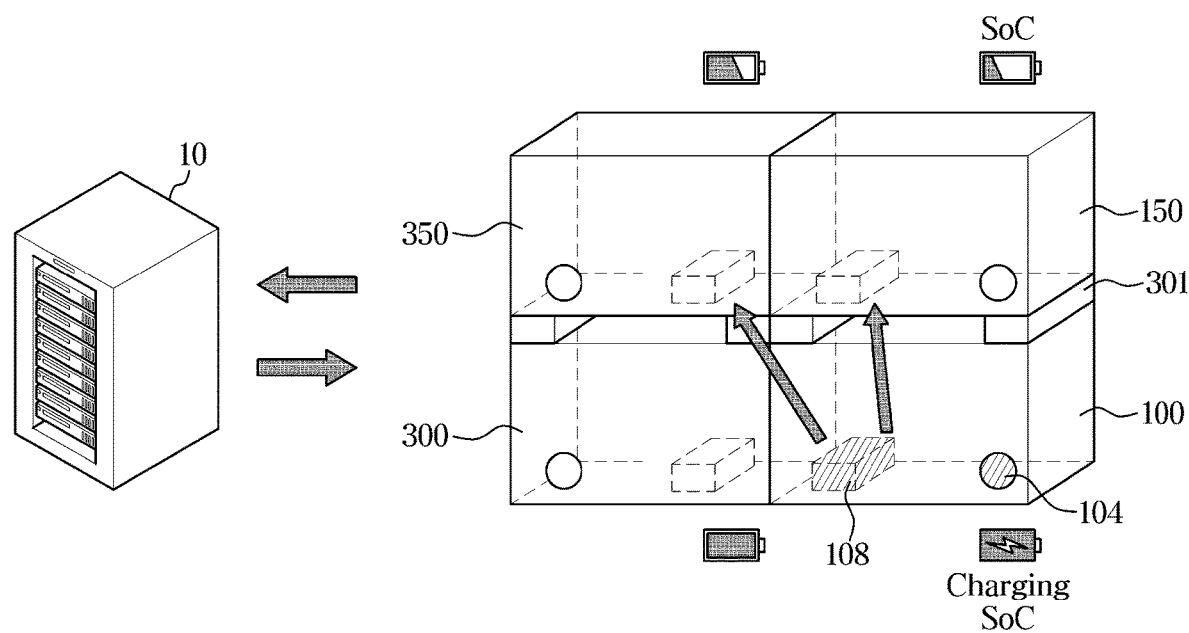
FIG. 7 is a diagram for describing operations of a server and a second personal mobility according to an embodiment.

FIG. 7 is a diagram for describing operations of the server 10 (or the controller 116 of the server 10), the first personal mobility 100 (or the controller device 112 of the first personal mobility 100), and the second personal mobility 150 (the controller device of the second personal mobility 150) according to an embodiment.

Figure 8:
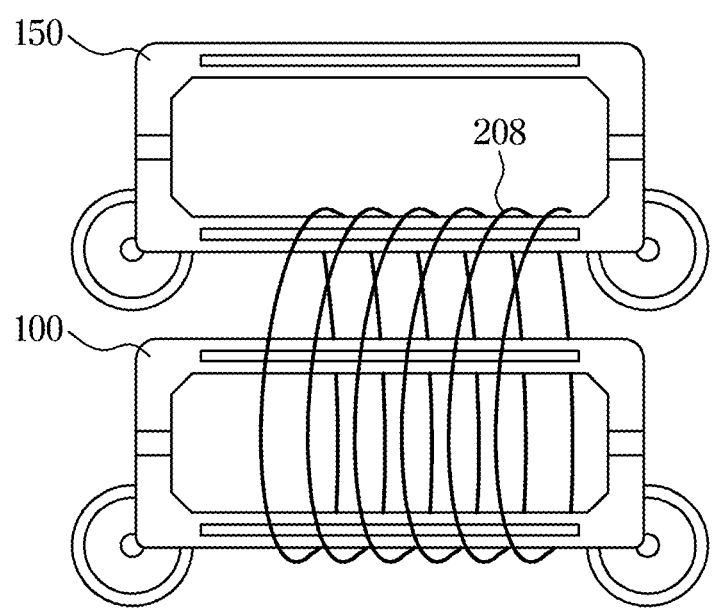
FIG. 8 is a diagram for describing a battery charging principle of a personal mobility based on a magnetic induction method according to an embodiment.

FIG. 8 is a diagram for describing a battery charging principle of a personal mobility based on a magnetic induction method according to an embodiment.

Referring to FIG. 6, the first personal mobility 100 may charge the battery 108 at 601.

The first personal mobility 100 may receive power from an external power source connected to the connection terminal 104 and charge the battery 108 based on the received power.

The first personal mobility 100 may transmit first information and second information to the server 10 at 603.

The first information may include a charge amount of the battery 108 and information indicating that the battery 108 is being charged, as shown in FIG. 7.

The second information may include information indicating an arrangement relationship of personal mobilities adjacent to each other.

Referring to FIG. 7, the information indicating the arrangement relationship of the personal mobilities includes information indicating that the second personal mobility 150 is located on the top of the first personal mobility 100 and information indicating that the third personal mobility 300 is located on the side of the first personal mobility 100, and/or information indicating that fourth personal mobility is located on the side of the second personal mobility 150 and on the top of the third personal mobility 300.

The second personal mobility 150 may transmit third information and fourth information to the server 10 at 605.

The third information may include a charge amount of the battery and information indicating that the battery is not being charged, as shown in FIG. 7.

The fourth information may include information indicating an arrangement relationship of personal mobilities adjacent to each other.

Referring to FIG. 7, the information indicating the arrangement relationship of the personal mobilities may include information that the first personal mobility 100 is located at the bottom of the second personal mobility 150, information indicating that the fourth personal mobility 350 is located on the side of the second personal mobility 150 and/or information indicating that the second personal mobility 150 is located on the side of the first personal mobility 100 and at the top of the fourth personal mobility 350.

The server 10 may generate a first control signal for causing the first conductive coil (e.g., the coil 106) to be switched into a state of power transmission based on the first information, the second information, the third information, and/or the fourth information at 607.

For example, the server 10 may receive the first information, the second information, the third information, and/or the fourth information through the communicator 12.

For example, the server 10 may identify that the battery 108 of the first personal mobility 100 is being charged based on the first information. The server 10 may generate the first control signal based on the battery 108 of the first personal mobility 100 being charged.

The server 10 may transmit the first control signal to the first personal mobility 100 at 609.

The first personal mobility 100 may control the wireless charging circuit 114 to cause the first conductive coil (e.g., the coil 106) to be switched into a state of power transmission based on the first control signal at 611.

For example, the first personal mobility 100 may receive the first control signal through the communication device 102.

For example, the first personal mobility 100 may control the wireless charging circuit 114 to cause the first conductive coil (e.g., the coil 106) to be switched into a state of power transmission when the charge amount of the battery 108 is greater than or equal to a predetermined reference value.

The server 10 may generate a second control signal for causing the second conductive coil to be switched into a state of power reception based on the first information, the second information, the third information, and/or the fourth information at 613.

For example, the server 10 may identify that the battery of the second personal mobility 100 is not being charged and a charge amount of the battery of the second personal mobility 100 based on the third information. The server 10 may generate a second control signal based on identifying that the battery of the second personal mobility 100 is not being charged and/or the charge amount of the battery.

The server 10 may transmit the second control signal to the second personal mobility 150 at 615.

For example, the server 10 may transmit the second control signal to the second personal mobility 150 through the communication device 102.

The second personal mobility 150 may control the wireless charging circuit of the second personal mobility 150 to cause the second conductive coil of the second personal mobility 150 to be switched into a state of power reception based on the second control signal at 617.

For example, the second personal mobility 150 may receive the second control signal through the communication device.

The first personal mobility 100 may transmit (also referred to as supply) wireless charging power induced in the first conductive coil (e.g., the coil 106) at 619.

For example, the first personal mobility 100 may control the wireless charging circuit 114 to transmit the wireless charging power induced on the first conductive coil (e.g., the coil 106).

The second personal mobility 100 may charge the battery of the second personal mobility 100 based on the wireless charging power at 621.

Referring to FIG. 8, the first conductive coil (e.g., the coil 106) in the frame 208 of the first personal mobility 100 (or in the chargeable band) may transmit a signal. The signal may detect a compatible receiving coil, i.e., a second conductive coil inside the frame of the second personal mobility 150. Upon detecting the second conductive coil, an electromagnetic induction operation may be initiated. Accordingly, electrons in the first conductive coil (e.g., the coil 106) start to flow around the first conductive coil (e.g., the coil 106) to generate a magnetic field, and electrons in the second conductive coil may detect the magnetic field. Thereafter, the electrons trapped in the second conductive coil start to flow around the second conductive coil due to the magnetic field, and the flow of the electrons may cause the battery of the second personal mobility 150 to be charged.

Meanwhile, in the above-described embodiment, information used by the first personal mobility 100 to control the wireless charging circuit 114 to cause the first conductive coil (e.g., the coil 106) to be switched into a state of power transmission based on the charge amount of the battery 108 being greater than or equal to a predetermined reference value may be included in the first control signal or may be stored in advance in the storage device 110 of the first personal mobility 100.

In addition, in the above-described embodiment, the second control signal, for the switching of the second conductive coil into a state for power reception, may include information related to a switching point in time that reflects a delay time corresponding to a time taken for the first personal mobility 100 to complete preparation for transmission of second power.

For example, for the switching of the second conductive coil into a state of power reception, the second control signal may further include information related to a switching point in time that reflects a delay time based on a separation distance between the first personal mobility 100 and the second personal mobility 150. In addition, the second control signal may include information related to a switching point in time that reflects a delay time based on a time taken for the first personal mobility 100 to switch the first conductive coil (e.g., the coil 106) into a state of power transmission after the first control signal is transmitted.

In addition, although not shown in FIG. 6, each of the third personal mobility 300 and the fourth personal mobility 350 may perform an operation corresponding to (or similar to) the second personal mobility 150 described above.

For example, the third personal mobility 300 may transmit fifth information and sixth information to the server 10.

The fifth information may include a charge amount of the battery of the third personal mobility 300 and information indicating that the battery is not being charged as shown in FIG. 7.

The sixth information may include information indicating an arrangement relationship of personal mobilities adjacent to the third personal mobility 300.

Upon receiving the fifth information and the sixth information, the server 10 may generate a third control signal for causing a third conductive coil of the third personal mobility 300 to be switched into a state of power reception, and transmit the third control signal to the third personal mobility 300.

The third personal mobility 300 may switch the third conductive coil of the third personal mobility 300 into a state of power reception based on the reception of the third control signal, and receive wireless charging power from the first personal mobility 100. Accordingly, the battery of the third personal mobility 300 may be charged.

For example, the fourth personal mobility 350 may transmit seventh information and eighth information to the server 10.

The seventh information may include a charge amount of the battery of the fourth personal mobility 350 and information indicating that the battery is not being charged, as shown in FIG. 7.

The eighth information may include information indicating an arrangement relationship of personal mobilities adjacent to the fourth personal mobility 350.

Upon receiving the seventh information and the eighth information, the server 10 may generate a fourth control signal for causing a fourth conductive coil of the fourth personal mobility 350 to be switched into a state of power reception, and transmit the fourth control signal to the fourth personal mobility 300.

The fourth personal mobility 350 may switch the fourth conductive coil of the fourth personal mobility 350 into a state of power reception based on the reception of the fourth control signal, and receive wireless charging power from the first personal mobility 100. Accordingly, the battery of the fourth personal mobility 350 may be charged.

In addition to the above-described embodiment, the server 10 may determine a personal mobility to which wireless charging power is to be transmitted based on information received from the first to fourth personal mobilities 100, 150, 300, and 350. For example, in response to existence of a plurality of personal mobilities to be supplied with wireless charging power, the server 10 may determine the order for sequentially transmitting wireless charging power.

For example, the server 10 may determine a personal mobility to which wireless charging power is to be transmitted based on the charge amount of each of the first to fourth personal mobilities 100, 150, 300, and 350. The server 10 may determine the second personal mobility 150 and the fourth personal mobility 350, in which the charge amount of the battery is less than or equal to a predetermined reference value, as the personal mobility to which wireless charging power is to be transmitted.

In addition, for example, the server 10 may determine the order of sequentially transmitting wireless charging power based on the charge amounts of the batteries of the second personal mobility 150 and the fourth personal mobility 350. The server 10 assigns the second personal mobility 150 having the smallest battery charge amount with the first order, and assigns the fourth personal mobility 350 having a relatively larger battery charge amount compared to the second personal mobility 150 with the second order.

The server 10 may transmit a first control signal including the determined order to the first personal mobility 100.

For example, the server 10 may transmit, to the first personal mobility 100, a first control signal including information indicating that the second personal mobility 150 is assigned with the first order and the fourth personal mobility 350 is assigned with the second order.

The first personal mobility 100, having received the first control signal, may first transmit wireless charging power to the second personal mobility 150, and based on completion of charging of the battery of the second personal mobility 150, may transmit wireless charging power to the fourth personal mobility 350.

Further, in addition to the above-described embodiment, a point in time at which the conductive coils of the second personal mobility 100, the third personal mobility 300, and the fourth personal mobility 350 are switched into states of power reception may be determined corresponding to a point in time at which the first personal mobility 100 transmit wireless charging power.

For example, when the first personal mobility 100 is completed with preparation for transmitting wireless charging power to the second personal mobility 100, the second personal mobility 150 may switch the second conductive coil into a state of power reception. For example, the second control signal may include information related to a switching point in time that reflects a delay time based on a time taken for the first personal mobility 100 to switch the first conductive coil (e.g., the coil 106) into a state of power transmission after the first control signal is transmitted. Upon receiving the second control signal including the information related to the switching point in time, the second personal mobility 150 may switch the second conductive coil into a state of power reception after a predetermined time based on the information related to the switching point in time.

In addition, for example, when the first personal mobility 100 is completed with preparing for transmitting wireless charging power to the third personal mobility 300, the third personal mobility 300 may switch the third conductive coil into a state of power reception. For example, the third control signal may include information related to a switching point in time that reflects a delay time based on a time taken for the first personal mobility 100 to complete transmission of wireless charging power to the second conductive coil of the second personal mobility 150 after the first control signal is transmitted. Upon receiving the third control signal including the information related to the switching point in time, the third personal mobility 300 may switch the third conductive coil into a state of power reception after a predetermined time based on the information related to the switching point in time.

In addition, for example, when the first personal mobility 100 is completed with preparing for transmitting wireless charging power to the fourth personal mobility 350, the fourth personal mobility 350 may switch the fourth conductive coil into a state of power reception. For example, the fourth control signal may include information related to a switching point in time that reflects a delay time based on a time taken for the first personal mobility 100 to complete transmission of wireless charging power to the second conductive coil of the second personal mobility 150 and complete transmission of wireless charging power to the third conductive coil of the third personal mobility 300 after the first control signal is transmitted. Upon receiving the fourth control signal including the information related to the switching point in time, the fourth personal mobility 350 may switch the fourth conductive coil into a state of power reception after a predetermined time based on the information related to the switching point in time.

According to the above-described embodiments, the server 10 may charge a plurality of personal mobilities included in one personal mobility bundle 3000 based on the SOCs of the batteries of the plurality of personal mobilities and information indicating whether the batteries are being charged (or whether the terminals for charging the batteries are connected to an external power source).

For example, when a plurality of personal mobilities are included in one personal mobility bundle 3000, one personal mobility included in the personal mobility bundle 3000, for example, the first personal mobility may be allowed to individually charge other personal mobilities therethrough (unification of the charging terminals).

In addition, for example, the states of charge (SOCs) of each of the plurality of personal mobilities included in the personal mobility bundle 300 may be different from each other. Accordingly, the server 10 may perform processing to determine a personal mobility from which power needs to be transferred and a personal mobility to which power needs to be transferred by integrating the arrangement relationship and the SOCs of each of the plurality of personal mobilities.

For example, the server 10 may control the coil of the personal mobility being charged through an external power source to be switched into a state of power transmission, and control the coils of the remaining personal mobilities, in which the SOCs are lower than a predetermined reference value, to be switched into a state of power reception such that power is transferred.

For example, the server 10 may serve as an efficient power distribution system by determining the charging priority of a plurality of personal mobilities included in one personal mobility bundle.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the personal mobility, the server, and the method of managing the personal mobility according to an aspect of the disclosure can provide a technique of managing personal mobilities in a bundle rather than in an individual unit.

For example, the personal mobility, the server, and the method of managing the personal mobility can provide a personal mobility having a box-shaped body that is easy to manage in a bundle and a system for performing integrated management on personal mobilities.

For example, the personal mobility, the server, and the method of managing the personal mobility can provide a charging algorithm and/or process of personal mobilities in a bundle.

The personal mobility, the server, and the method of managing the personal mobility according to an aspect of the disclosure can reduce the operational burden, such as time waste and cost increase caused by managing personal mobilities in an individual unit by the conventional personal mobility sharing service company.

For example, the personal mobility, the server, and the method of managing the personal mobility can allow a personal mobility sharing service provider to manage a series of personal mobilities in a bundle rather than individually managing personal mobilities, such as battery charging, battery SOC checking, repairing and/or redistribution of personal mobilities in an individual unit.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The invention claimed is:

1. A server comprising:
   a communicator; and
   a controller electrically connected to the communicator;
   wherein the controller is configured to:
      receive, from a plurality of personal mobilities, first information related to a battery of each of the plurality of personal mobilities through the communicator;
      transmit, to a first personal mobility among the plurality of personal mobilities, a first control signal for causing a first conductive coil of the first personal mobility to be switched into a state for power transmission through the communicator, based on first information; and
      transmit, to a second personal mobility among the plurality of personal mobilities, a second control signal for causing a second conductive coil of the second personal mobility to be switched into a state for power reception through the communicator;
      wherein the first information includes a charge amount of the battery of each of the plurality of personal mobilities, and information indicating whether the battery of each of the plurality of personal mobilities is being charged; and
      wherein the controller is further configured to identify the first personal mobility including a first battery, which is being charged, among the plurality of personal mobilities based on the information indicating whether the battery of each of the plurality of personal mobilities is being charged.

2. The server of claim 1, wherein the first control signal includes a control signal for causing the first conductive coil of the first personal mobility to be switched into a state for power transmission, based on a first charge amount of the first battery of the first personal mobility being greater than or equal to a predetermined reference value.

3. The server of claim 1, wherein the controller is further configured to transmit, to a third personal mobility among the plurality of personal mobilities, a third control signal for causing a third conductive coil of the third personal mobility to be switched into a state for power reception through the communicator.

4. The server of claim 3, wherein the controller is further configured to determine an order in which the first personal mobility sequentially transmits power to the second personal mobility and then the third personal mobility, based on the charge amount of the battery of each of the plurality of personal mobilities, wherein the first control signal includes information related to the order.

5. The server of claim 1, wherein the second control signal includes a control signal for causing the second conductive coil of the second personal mobility to be switched into a state for power transmission when the second battery of the second personal mobility is completely charged.

6. The server of claim 1, wherein the controller is further configured to:
   receive, from each of the plurality of personal mobilities, second information indicating an arrangement relationship of personal mobilities adjacent to each other through the communicator; and
   identify the plurality of personal mobilities as being included in a personal mobility bundle based on the second information.

7. A method of managing a personal mobility by a server, the method comprising:
   receiving, from a plurality of personal mobilities, first information related to a battery of each of the plurality of personal mobilities through a communicator of a server;
   transmitting, to a first personal mobility among the plurality of personal mobilities, a first control signal for causing a first conductive coil of the first personal mobility to be switched into a state for power transmission through the communicator, based on the first information; and
   transmitting, to a second personal mobility among the plurality of personal mobilities, a second control signal for causing a second conductive coil of the second personal mobility to be switched into a state for power reception through the communicator;
   wherein the first information includes a charge amount of the battery of each of the plurality of personal mobilities, and information indicating whether the battery of each of the plurality of personal mobility is being charged; and
   wherein the method further comprises identifying the first personal mobility including a first battery, which is being charged, among the plurality of personal mobilities based on the information indicating whether the battery of each of the plurality of personal mobility is being charged.

8. The method of claim 7, wherein the first control signal includes a control signal for causing the first conductive coil of the first personal mobility to be switched into a state for power transmission, based on a first charge amount of the first battery of the first personal mobility being greater than or equal to a predetermined reference value.

9. The method of claim 7, further comprising transmitting, to a third personal mobility among the plurality of personal mobilities, a third control signal for causing a third conductive coil of the third personal mobility to be switched into a state for power reception through the communicator.

* * * * *